US009827513B2

(12) United States Patent
Ekholm et al.

(10) Patent No.: US 9,827,513 B2
(45) Date of Patent: Nov. 28, 2017

(54) DIFFUSER BASKET

(71) Applicant: Bilfinger Water Technologies, Inc., New Brighton, MN (US)

(72) Inventors: Michael Richard Ekholm, Minneapolis, MN (US); Benjamin A. Schmitt, Isanti, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 0 days.

(21) Appl. No.: 14/776,333

(22) PCT Filed: Mar. 14, 2014

(86) PCT No.: PCT/US2014/027464
§ 371 (c)(1),
(2) Date: Sep. 14, 2015

(87) PCT Pub. No.: WO2014/152549
PCT Pub. Date: Sep. 25, 2014

(65) Prior Publication Data
US 2016/0038856 A1 Feb. 11, 2016

Related U.S. Application Data

(60) Provisional application No. 61/798,403, filed on Mar. 15, 2013.

(51) Int. Cl.
*B01D 24/40* (2006.01)
*B01D 35/00* (2006.01)
(Continued)

(52) U.S. Cl.
CPC .......... *B01D 24/402* (2013.01); *B01D 35/00* (2013.01); *F16L 55/07* (2013.01); *F16L 55/24* (2013.01); *F16L 2101/40* (2013.01)

(58) Field of Classification Search
CPC ...... B01D 24/38; B01D 24/402; B01D 35/00; F16L 55/07; F16L 55/24; F16L 2101/40
(Continued)

(56) References Cited

U.S. PATENT DOCUMENTS 1,250,434 A * 12/1917 Connet ................ F41A 21/30
138/37
1,700,564 A * 1/1929 Eilar ..................... E21B 33/03
138/37
(Continued)

FOREIGN PATENT DOCUMENTS

EP 0053115 B1 9/1985
EP 0943364 A2 9/1999
(Continued)

OTHER PUBLICATIONS

International Bureau; Notification Concerning Transmittal of International Preliminary Report on Patentability and International Preliminary Report on Patentability; dated Sep. 15, 2015; for Application No. PCT/US2014/027464, 8 pages.
(Continued)

*Primary Examiner* — Ian Paquette
(74) *Attorney, Agent, or Firm* — Patterson Thuente Pedersen, P.A.

(57) ABSTRACT

A diffuser basket includes a screen portion and a flow modifier positioned within the screen portion. The flow modifier is configured to change the direction of flow of a fluid introduced into the diffuser basket. The flow modifier can include a plurality of flat plates coupled to the screen portion and positioned at spaced apart intervals along a longitudinal axis of the diffuser basket. The flow modifier can include a plurality of truncated conical plates positioned at spaced apart intervals along a longitudinal axis of the diffuser basket, the plurality of truncated conical plates coupled to the screen portion. The plurality of flat or (Continued)

truncated conical plates each can include an opening. The plurality of flat truncated conical plates each has a cone angle that forms an oblique angle with respect to the longitudinal axis. These cone angles can be the same or they can be different.

22 Claims, 11 Drawing Sheets

(51) Int. Cl.
*F16L 55/07* (2006.01)
*F16L 55/24* (2006.01)
*F16L 101/40* (2006.01)

(58) Field of Classification Search
USPC .............. 137/574, 584; 210/305, 315, 316; 251/127; 138/37, 41, 42
See application file for complete search history.

(56) References Cited

U.S. PATENT DOCUMENTS

| | | | |
|---|---|---|---|
| 3,045,984 A * | 7/1962 | Cochran | ............... B01F 5/0682 138/38 |
| 4,399,034 A | 8/1983 | Möller | |
| 5,300,224 A | 4/1994 | Farley | |
| 5,584,998 A | 12/1996 | Teter et al. | |
| 5,588,635 A | 12/1996 | Hartman | |
| 6,715,544 B2 | 4/2004 | Gillespie | |
| 6,877,726 B1 * | 4/2005 | Rindt | .................... B01F 3/0473 210/198.1 |
| 9,221,022 B2 * | 12/2015 | Glanville | .............. B01F 5/0605 |

FOREIGN PATENT DOCUMENTS

| | | |
|---|---|---|
| EP | 1462153 A1 | 9/2004 |
| WO | WO 2004-071622 A1 | 8/2004 |

OTHER PUBLICATIONS

International Search Report dated Aug. 21, 2014, for PCT/US2014/027464.

Office Action dated Aug. 22, 2016 for Chinese Application No. 201480026853.0, 32 pages.

Office Action dated Dec. 15, 2016 for EP Application No. 14769695.9, 10 pages.

* cited by examiner

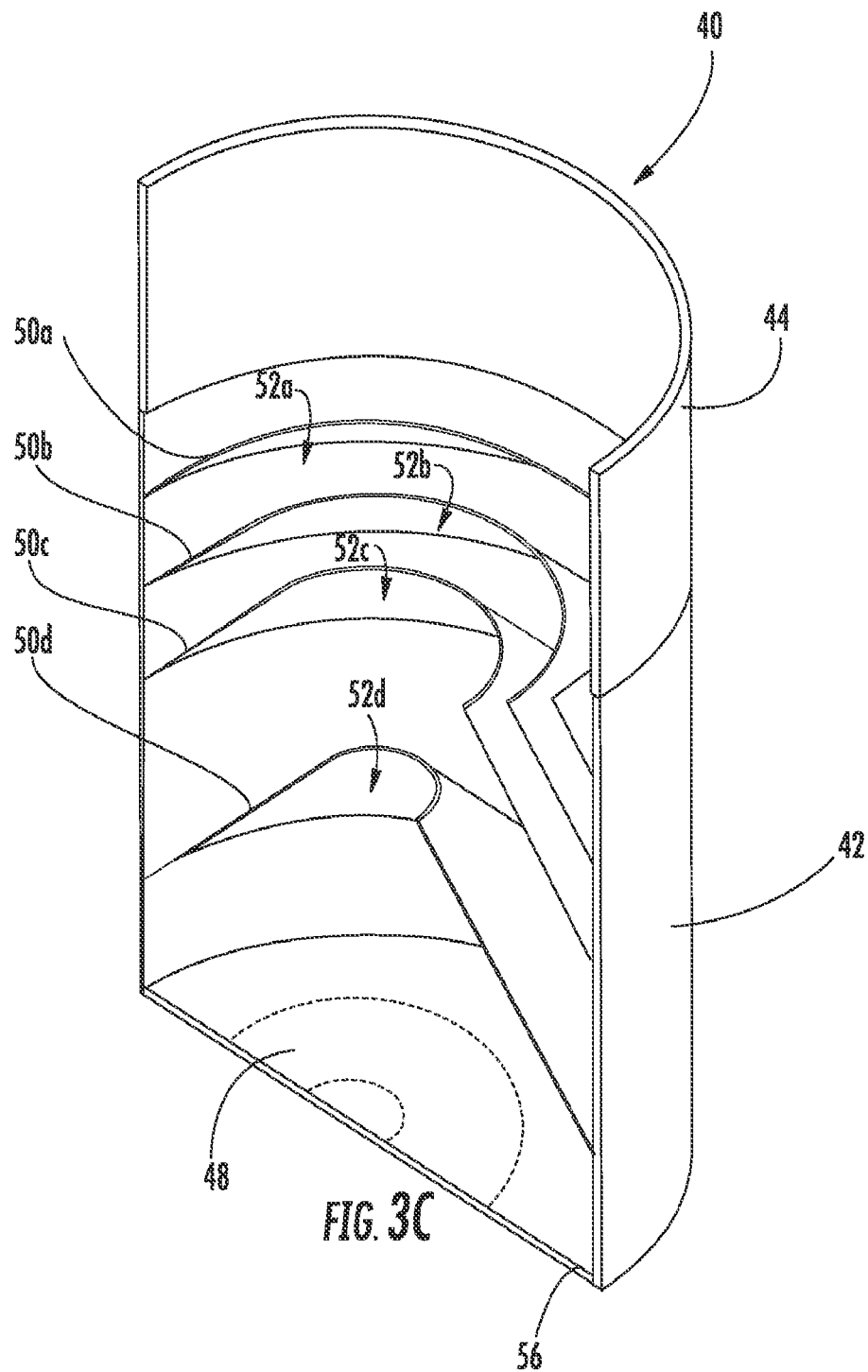

DIFFUSER BASKET

CROSS-REFERENCE TO RELATED APPLICATION

This application claims priority to U.S. provisional patent application Ser. No. 61/798,403, filed Mar. 15, 2013, the entirety of which application is incorporated by reference.

FIELD OF THE DISCLOSURE

The disclosure relates generally to the field of filtration equipment, and more particularly to a diffuser arrangements for use in the inlet or outlet of filter media vessels.

BACKGROUND OF THE DISCLOSURE

Pressure vessels are used in chemical processes and often operate by introducing a flow of fluid through the top of the vessel, and acting on that flow as it passes downward through media within the vessel. The fluid is typically discharged through an outlet disposed at or near the bottom of the vessel. The inlet of the pressure vessel is in many cases simply a pipe or tube stub attached to inlet piping connected to the vessel.

As will be appreciated, distribution of the inlet flow can have a great effect on the efficiency of the media in the vessel. Several methods have been employed to enhance inlet flow distribution, with varying degrees of success. In some cases, the inlet region can be provided with a deflector plate that prevents flow from simply impinging at full velocity directly downward into the media. In other cases a basic screen has been used, with little or no flow control. The screen can also be used to prevent media from migrating into the inlet pipe during backflow phases of operation, but otherwise it does little to improve flow performance. Other techniques include the introduction of header lateral assemblies within the pressure vessel. Such arrangements can include a set of branching pipes that connect to the inlet, extending into the vessel in a "ladder" or "star-shaped" pattern. Such headers/laterals are undesirable because they require additional support in the vessel and have a high implementation cost. In some cases a full vessel diameter screen, a tube sheet (plate with a pattern of screen or pip nozzles) or a perforated plate are used, again with varying results.

SUMMARY

In view of the aforementioned deficiencies in the art, it would be desirable to provide an improved diffuser basket arrangement for pressure vessel inlet and/or outlet connections.

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

According to one embodiment, the present invention comprises a diffuser basket having an exterior having an inlet, at least a portion of the exterior being perforated. The diffuser basket comprises at least one diffuser being positioned inside the exterior between the inlet and the outlet. In one embodiment, the at least one diffuser has a conical configuration. In one embodiment, the diffuser basket comprises a plurality of diffusers in series.

In another embodiment, the present invention comprises a method for diffusing flow of a fluid. The method comprising providing a diffuser basket, the diffuser basket comprising an exterior having an inlet, at least a portion of the exterior being perforated; and at least one diffuser being positioned inside the exterior between the inlet and the outlet. The method further comprising passing fluid into the inlet, onto the outlet and through a perforation in the exterior. In one embodiment, the diffuser basket comprises at least one diffuser has a cortical configuration. In another embodiment, the diffuser basket comprises a plurality of diffusers in series A diffuser basket is disclosed, comprising a screen portion and a flow modifier positioned within the screen portion. The flow modifier can be configured to change the direction of flow of a fluid introduced into the diffuser basket.

A method for diffusing flow of a fluid comprises: introducing fluid into an inlet of a diffuser basket, the diffuser basket comprising a screen portion and a flow modifier positioned within the screen portion; and dispersing flow of the fluid onto a media surface opposite the diffuser basket; wherein the flow is dispersed according to a configuration of the flow modifier.

BRIEF DESCRIPTION OF THE DRAWINGS

By way of example, various embodiments of the disclosed device will now be described, with reference to the accompanying drawings, in which:

FIGS. 3B and 3C are cross-section and cutaway views, respectively, of the diffuser basket of FIG. 3A taken along line 3-3 of FIG. 3A;

DETAILED DESCRIPTION

Figure 1:
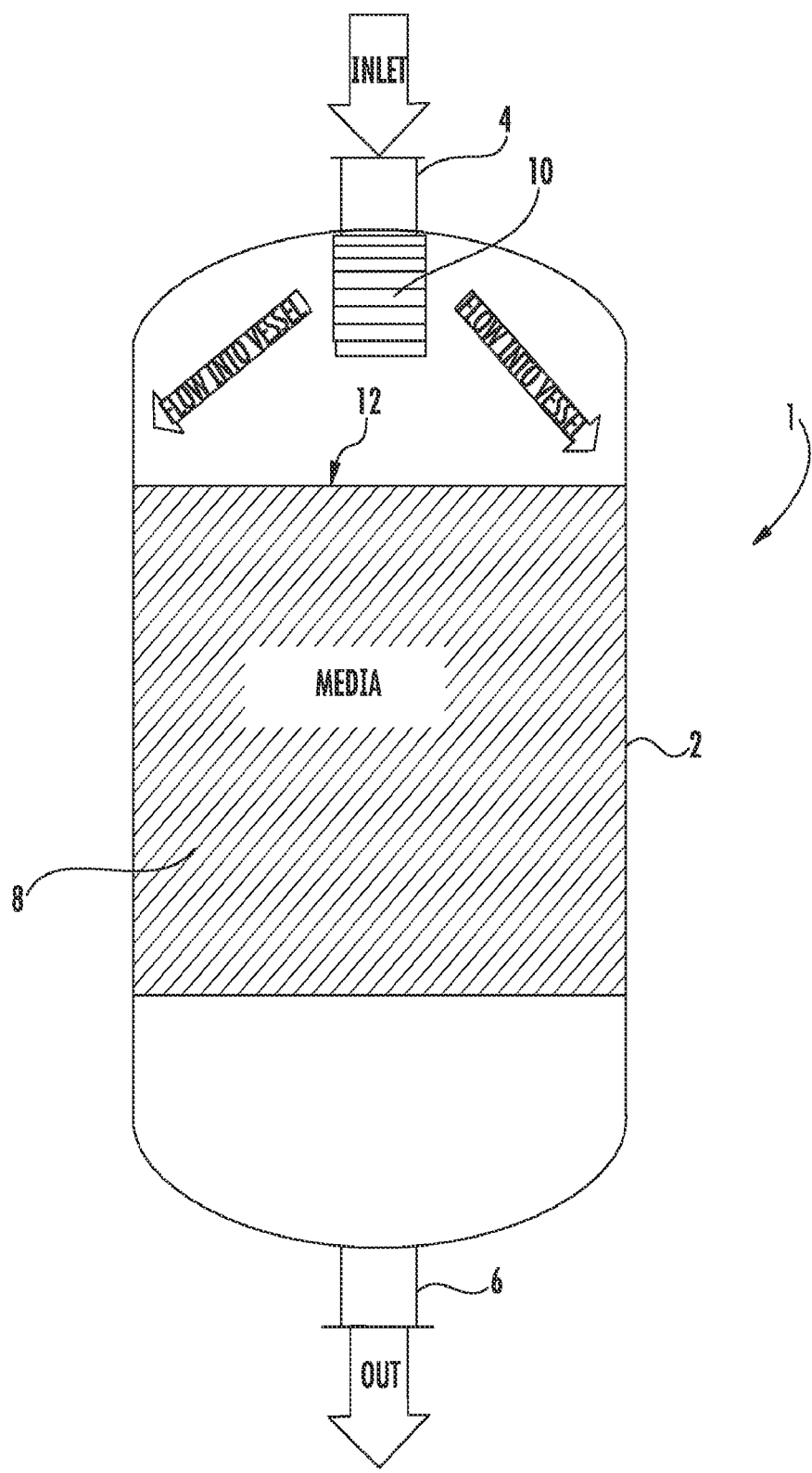
FIG. 1 is a cross-section of an exemplary pressure vessel for use with the disclosed diffuser basket, in accordance with embodiments of the present invention.

The disclosed system will now be described more fully hereinafter with reference to the accompanying drawings, in which preferred embodiments of the invention are shown. The disclosed system, however, may be embodied in many different forms and should not be construed as being limited to the embodiments set forth herein. Rather, these embodiments are provided so that this disclosure will be thorough and complete, and will fully convey the scope of the disclosed system to those skilled in the art. In the drawings, like numbers refer to like elements throughout.

As will be described, the disclosed diffuser basket can incorporate an internal flow control arrangement consisting of several tubular, ring or conical concentric vanes. These vanes can be positioned inside the screen basket to direct flow strategically to targeted areas of the media that is disposed within the associated pressure vessel. The diffuser basket can enhance distribution of the inlet fluid to the media, improving utilization of that media. A plurality of flow control arrangements can be used in the disclosed diffuser basket. For example, a set of tubes can be employed to divide inlet flow into areas of control, a set of plates can be used to redirect flow to exit the diffuser basket at various levels resulting in strategic distribution, and a set of conical elements can be used to place flow at strategic zones within the pressure vessel. Combinations of these features may be used in a single diffuser basket, as will be described in greater detail later. In some embodiments the flow control devices comprise concentric elements, but this is not critical, and eccentric or asymmetric designs can also be used.

Referring to FIG. 1, an exemplary pressure vessel 1 includes a vessel body 2, a vessel inlet 4 and a vessel outlet 6. The vessel body 2 may contain a quantity of filter media 8 through which fluid supplied via the vessel inlet 4 will pass for filtration, ion exchange, or other appropriate process. A diffuser basket 10 may be disposed within or adjacent to the vessel inlet 4 to distribute fluid (gas or liquid) from the vessel inlet to a top surface 12 of the filter media 8 in a desired manner or according to a desired pattern.

Figure 2A:
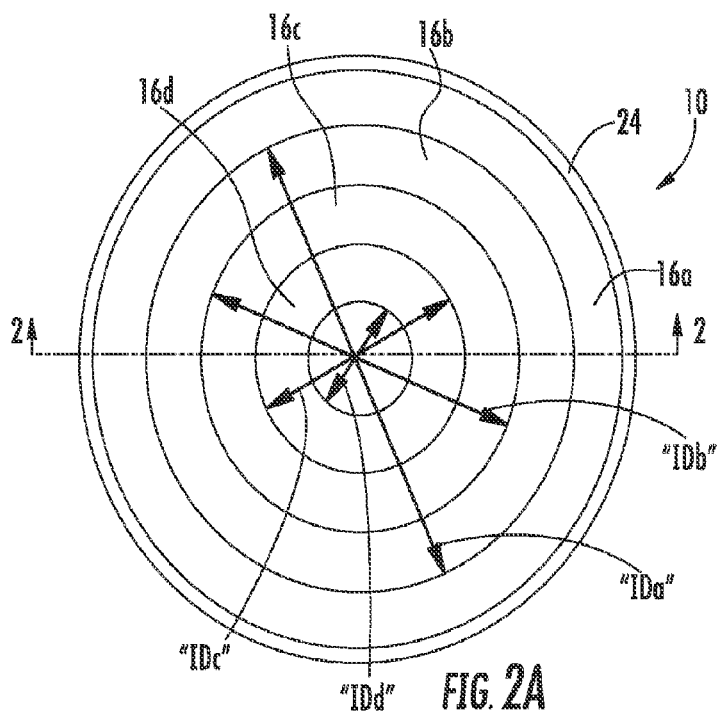
FIG. 2A is a top view of an embodiment of the disclosed diffuser basket.
Figure 2B:
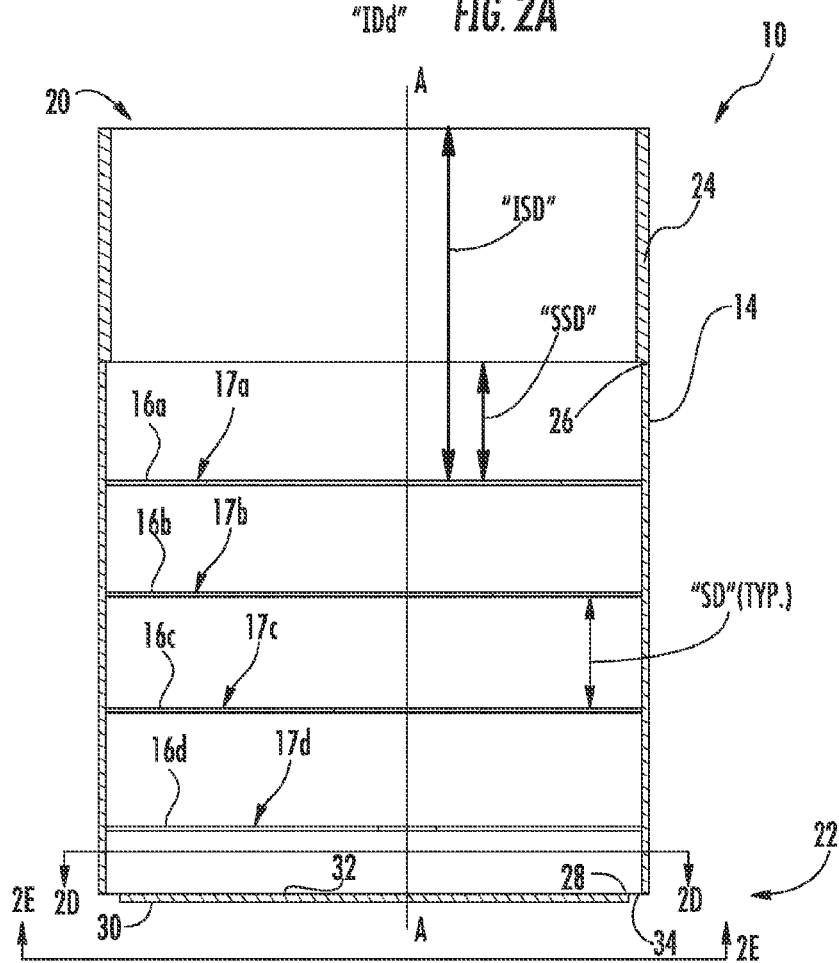
FIGS. 2B and 2C are cross-section and cutaway views, respectively, of the diffuser basket of FIG. 2A taken along line 2-2 of FIG. 2A.
Figure 2C:
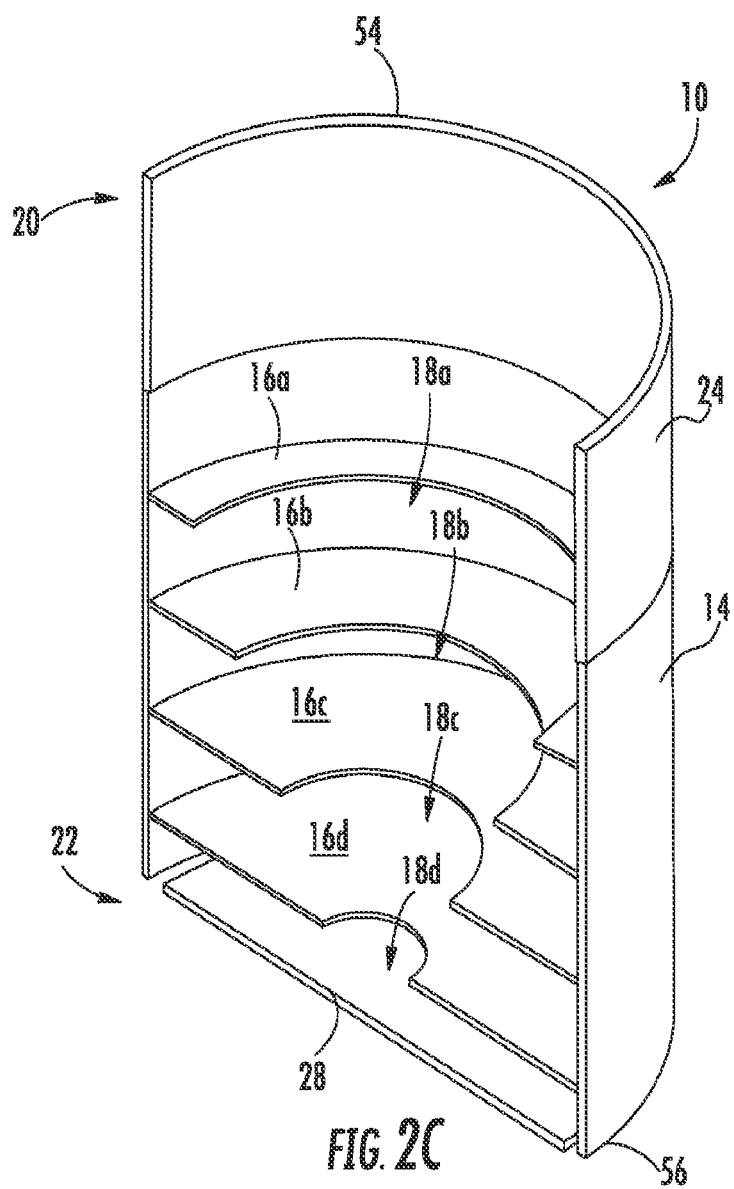

FIGS. 2A-2C illustrate an exemplary embodiment of the diffuser basket 10, which includes a screen portion 14 and a plurality of flow modifiers 16a-d disposed within the screen portion. In the illustrated embodiment the screen portion 14 is a generally cylindrical member, but this is not critical and other shapes can be used. It will be appreciated, however, that the use of a screen portion 14 having a generally cylindrical shape may facilitate a desired fit-up within the generally cylindrical shape of the vessel inlet 4.

The diffuser basket 10 may have an inlet end 20 and an outlet end 22. In the illustrated embodiment, a solid cylindrical member 24 is positioned at the inlet end 20 of the diffuser basket 10 and is coupled to an upstream end 26 of the screen portion 14. Providing a solid cylindrical member 24 upstream of the screen portion 14 may facilitate connection to the vessel inlet 4 by welding (or by a flanged connection, not shown). A lower screen plate 28 may be positioned at or adjacent to the outlet end 22 of the diffuser basket 10. The lower screen plate 28 may be a screen element, and in some embodiments the lower screen plate has a solid or perforated plate element 30 connected to the top 32 or bottom 34 surface thereof. In the illustrated embodiment the plate element 30 is coupled (e.g., welded) to the bottom surface 34 of the lower screen plate 28. The plate element 30 can have any of a variety of shapes, as desired, to provide a desired flow path for fluid to be dispersed to the media 8 within the pressure vessel 1. In one non-limiting exemplary embodiment the plate element 30 is a circular disc member having an opening in the center.

Figure 2D:
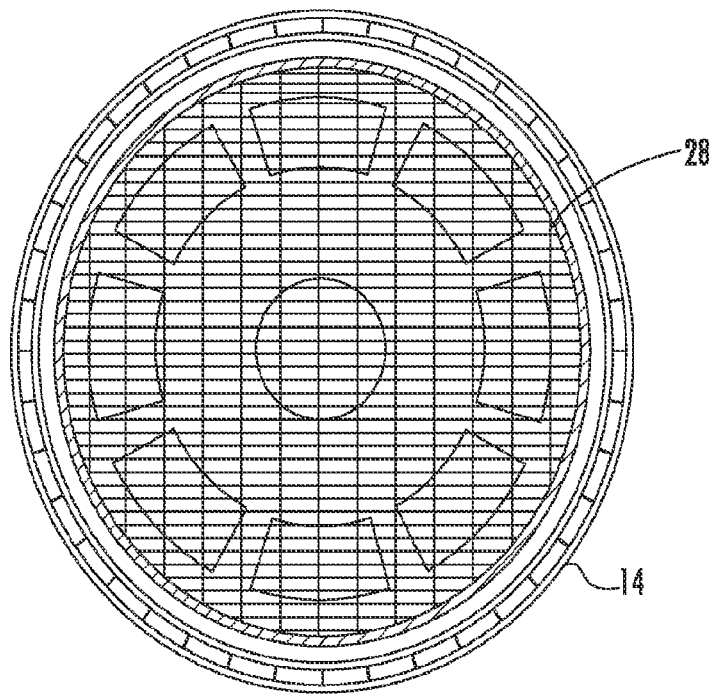
FIG. 2D is a cross-section view of the diffuser basket of FIGS. 2A-2C taken along line 2D-2D of FIG. 2B.
Figure 2E:
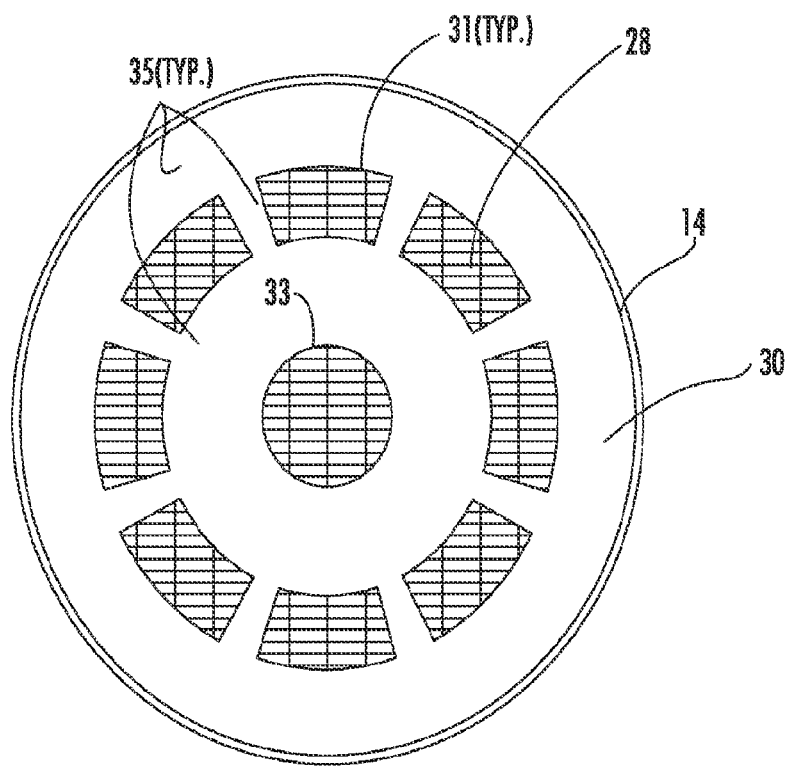
FIG. 2E is a bottom view of the diffuser basket of FIGS. 2A-2C taken along line 2E-2E of FIG. 2B.

The lower screen plate 28 and plate element 30 are shown in greater detail in FIGS. 2D and 2E. FIG. 2D is shows the lower screen plate 28 coupled directly or indirectly to the screen portion 14 adjacent to an outlet end 56 of the diffuser basket 10. FIG. 2E shows the plate element 30 coupled to the bottom surface 34 (FIG. 2B) of the lower screen plate 28 and/or the screen portion 14. As will be appreciated, as fluid flows from the inlet to the outlet of the diffuser basket 10, fluid can pass through the portions of the lower screen plate 28 that are not blocked by the solid portions of the plate element 30. Thus, by carefully selecting the shape and size of the openings 31, 33 in the plate element 30, flow though the outlet end 56 of the diffuser basket 10 can be controlled. In the illustrated embodiment, the plate element 30 comprises a plurality of openings 31 positioned around a central opening 33, and separated by plate segments 35. It will be appreciated that this is but one possible configuration of openings, and a wide variety of different shapes and sizes of openings (including different numbers of individual plate elements) can be used to obtain a desired flow, or a desired restriction of flow, out of the outlet end 56 of the diffuser basket 10. In addition, although the plate segments 35 are shown as being solid, they can be perforated to achieve a desired flow therethrough. Further, although the plate element 30 is shown as being coupled to the bottom surface 34 of the lower screen plate 28, the plate element can alternatively be positioned on the top surface 32 of the lower screen plate. It is also contemplated that multiple plate elements 30 can be provided, for example, with one plate element positioned on the top surface 32 and one plate element on the bottom surface 34 off the lower screen plate 28.

In the embodiment of FIGS. 2A-2C the plurality of flow modifiers 16a-d comprise a series of concentric plates positioned in spaced apart relation along the longitudinal axis A-A of the diffuser basket. As shown each of the flow modifiers 16a-d is positioned at a predetermined standoff distance "SD" with respect to adjacent flow modifiers. In this embodiment the standoff distance "SD" is the same for all of the flow modifiers 16a-d so that they are evenly spaced along the longitudinal axis A-A, although this is not critical and other spacing schemes can be used. The flow modifier 16a located closest to an inlet end 20 of the diffuser basket 10 can be positioned at a predetermined inlet standoff distance "ISD" from the inlet end, and/or at a predetermined screen inlet standoff distance "SSD" from the upstream end 26 of the screen portion 14. The standoff distance "SD," inlet standoff distance "ISD" and screen inlet standoff distance "SSD" can be of the same magnitude, or they can be of different magnitudes.

The flow modifiers 16a-d also have respective openings 18a-d centered along the longitudinal axis A-A of the diffuser basket 10. The flow modifiers 16a-d of this embodiment are oriented such that their upper surfaces 17a-d are oriented perpendicular to the longitudinal axis A-A of the diffuser basket 10. The openings 18a-d in the flow modifiers 16a-d can be circular, and can have progressively smaller diameters "IDa"-"IDd" such that the diameter "IDd" of the opening 18d associated with flow modifier 16d is substantially smaller than the diameter "IDa" of the opening 18a associated with flow modifier 16a. The relative sizing of the openings 18a-d can be selected so as to provide a linear reduction going from the inlet end 20 to the outlet end 22 of the diffuser basket. This is not critical, however, and other relative sizing schemes for the openings 18a-d can also be used.

Figure 3A:
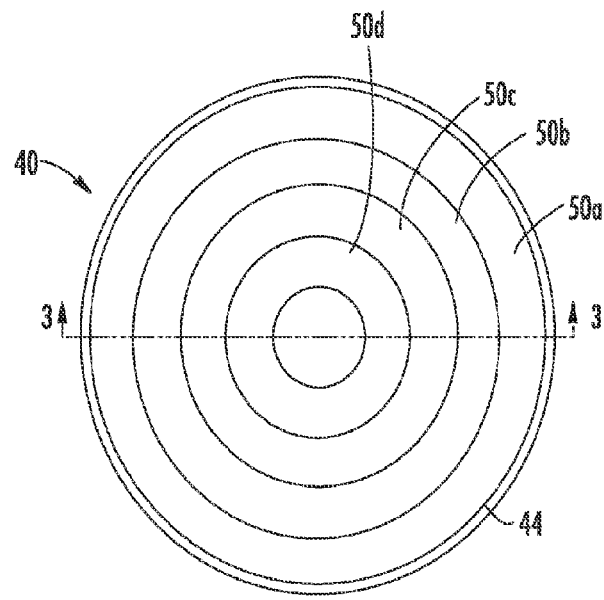
FIG. 3A is a top view of an embodiment of the disclosed diffuser basket.
Figure 3B:
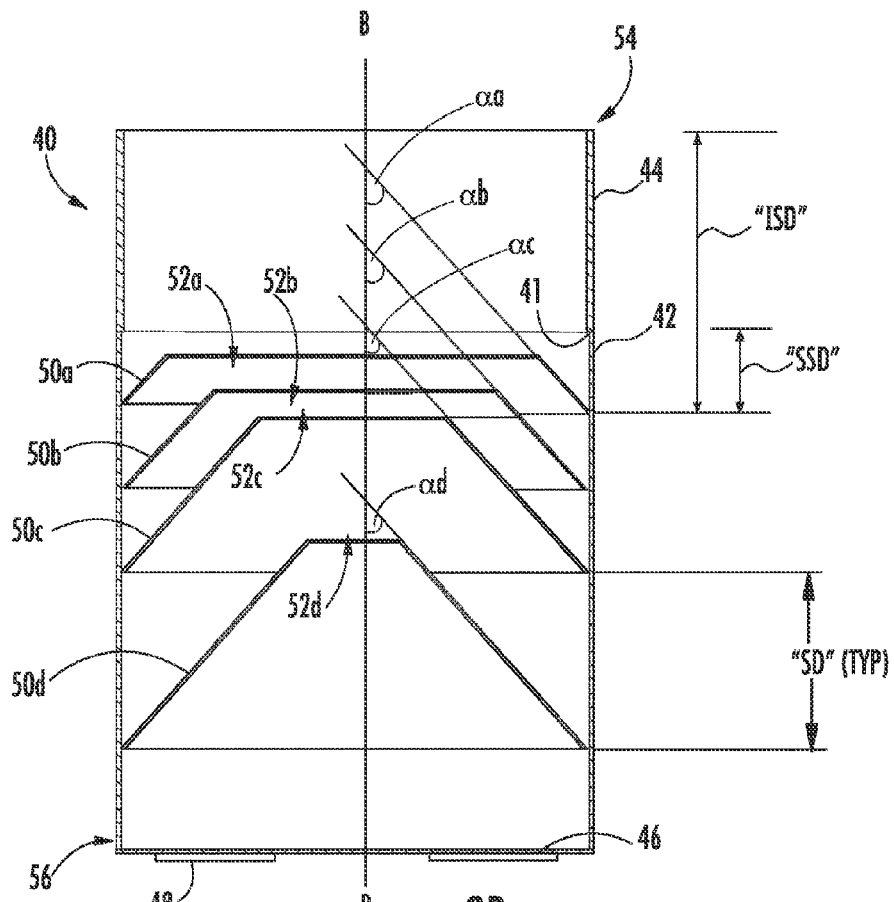

Another embodiment of a diffuser basket 40 is shown in FIGS. 3A-C. The illustrated diffuser basket 40 may include a screen portion 42, a solid cylindrical member 44, a lower screen plate 46 and a solid or perforated plate element 48 that are the same as or similar to those described in relation to the embodiment of FIGS. 2A-2E. The diffuser basket 40 may also include a plurality of flow modifiers 50a-50d positioned within the screen portion 42 at spaced intervals along the longitudinal axis B-B of the diffuser basket. The flow modifiers 50a-50d may comprise truncated cone elements having cone surfaces oriented at oblique angles αa-αd with respect to the longitudinal axis B-B of the diffuser basket 40. In some embodiments these oblique angles αa-αd are between 0-degrees and 90-degrees. Some or all of the oblique angles αa-αd can be the same, or some or all of the oblique angles or they can be different. In the illustrated embodiment the oblique angles αa-αd are equal to each other. Each of the flow modifiers 50a-50d may further have a respective opening 52a-52d concentrically arranged with respect to the longitudinal axis B-B of the diffuser basket 40. In the illustrated embodiment, the openings 52a-52d are progressively smaller (i.e., going from the inlet end 54 of the diffuser basket 40 to the outlet end 56 of the diffuser basket).

As shown each of the flow modifiers 50a-50d is positioned at a predetermined standoff distance "SD" with respect to adjacent flow modifiers. In this embodiment the standoff distance "SD" is different for some or all of the flow modifiers 50a-50d, although this is not critical and other spacing schemes can be used. The flow modifier 50a located closest to an inlet end 54 of the diffuser basket 40 can be positioned at a predetermined inlet standoff distance "ISD" from the inlet end, and/or at a predetermined screen inlet standoff distance "SSD" from the upstream end 41 of the screen portion 42. The standoff distance "SD," inlet standoff distance "ISD" and screen inlet standoff distance "SSD" can be of the same magnitude, or they can be of different magnitudes.

Figure 4A:
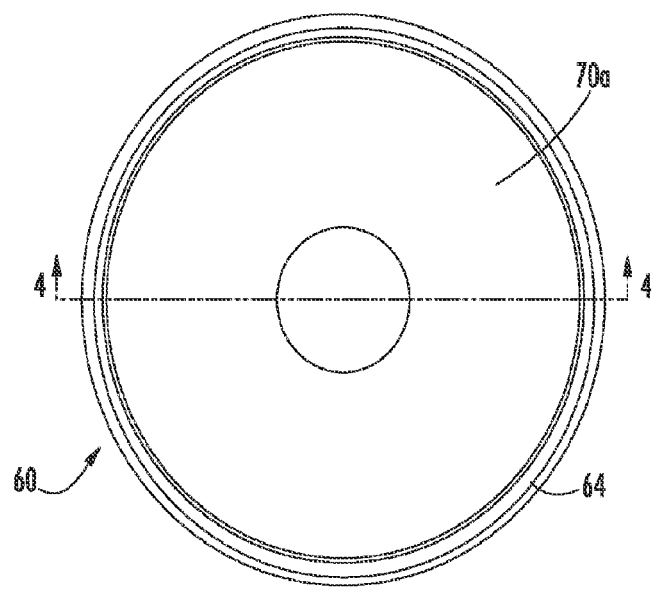
FIG. 4A is a top view of an embodiment of the disclosed diffuser basket.
Figure 4B:
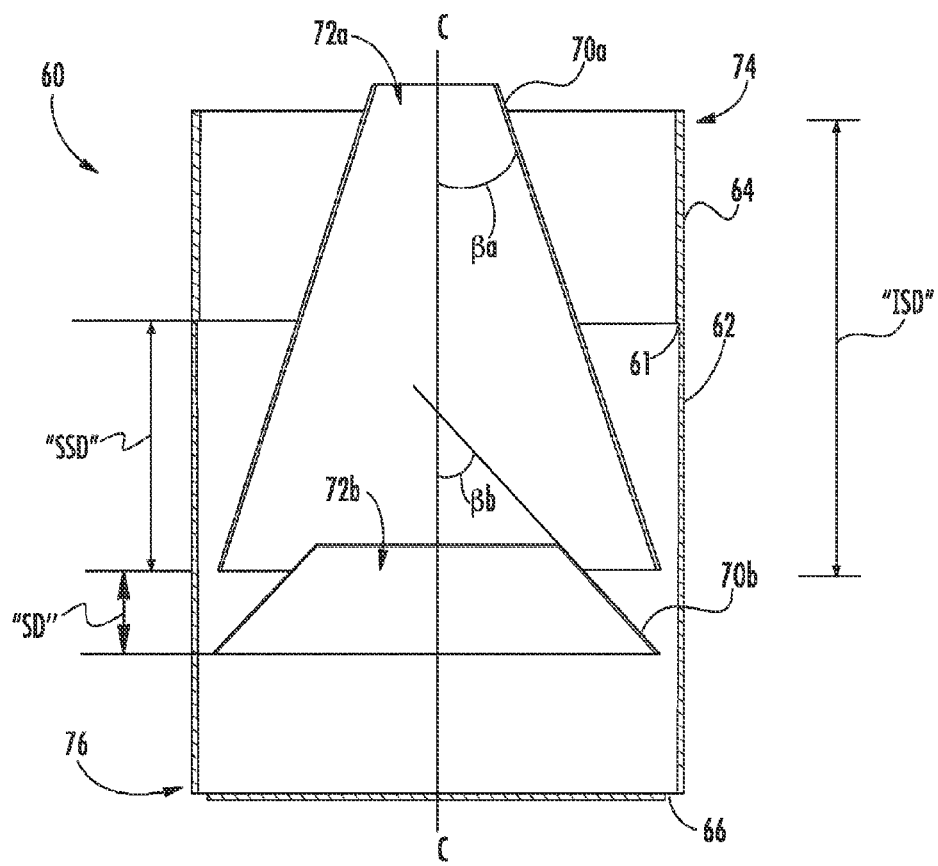
FIGS. 4B and 4C are cross-section and cutaway views, respectively, of the diffuser basket of FIG. 4A taken along line 4-4 of FIG. 4A.
Figure 4C:
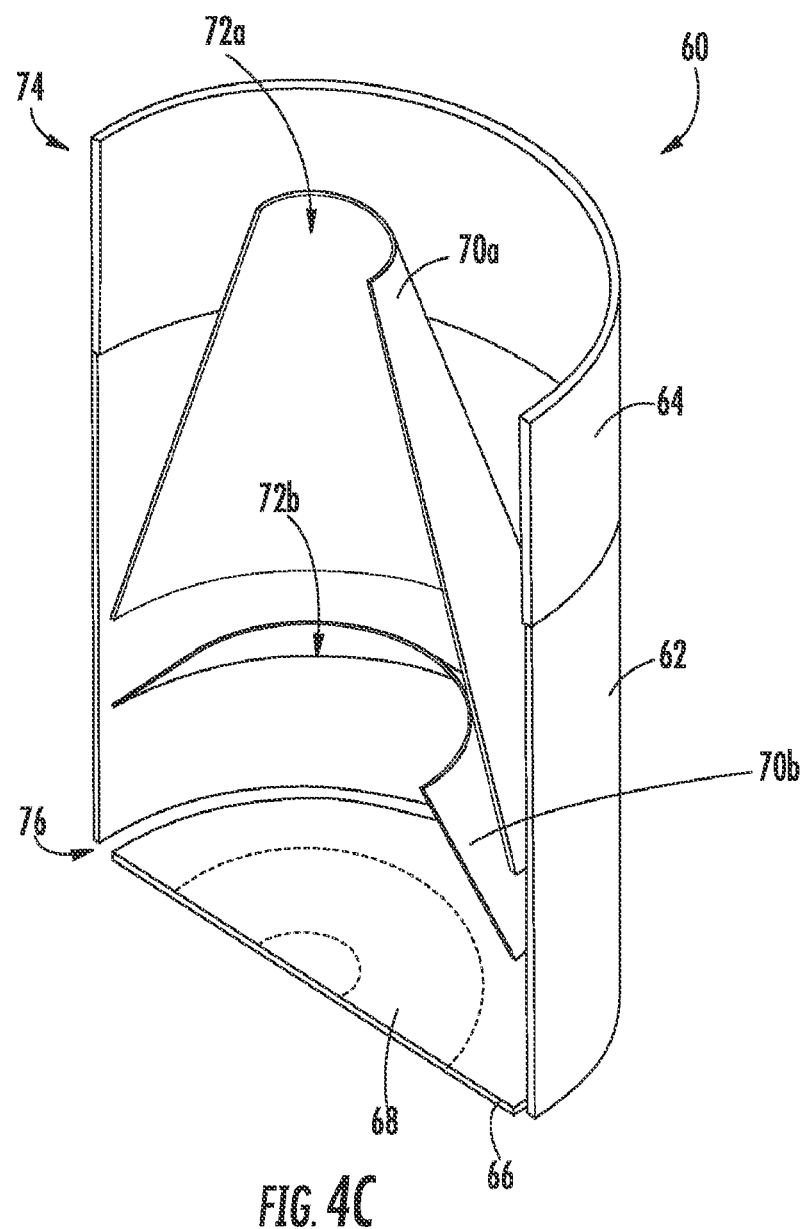

FIGS. 4A-4C show another embodiment of the disclosed diffuser basket 60. The illustrated diffuser basket 60 may include a screen portion 62, a solid cylindrical member 64, a lower screen plate 66 and a solid or perforated plate element 68 that are the same as or similar to those described in relation to the embodiment of FIGS. 2A-2E. The diffuser basket 60 may also include a plurality of flow modifiers 70a-70b positioned within the screen portion 62 at spaced intervals along the longitudinal axis C-C of the diffuser basket. The illustrated embodiment includes two flow modifiers 70a-70b that comprise truncated cone elements having cone surfaces oriented at oblique angles βa-βb with respect to the longitudinal axis C-C of the diffuser basket 60. In some embodiments these oblique angles βa-βb are between 0-degrees and 90-degrees. In the illustrated embodiment, the oblique angles βa-βb are different from each other. That is, the oblique angle βa of one flow modifier 70a is smaller than the oblique angle βb of the second flow modifier 70b. In some embodiments, however, the cone angles βa-βb can be the same, while in other embodiments the oblique angle βa may be larger than the oblique angle βb.

Each of the flow modifiers 70a-70b may further have a respective opening 72a-72b concentrically arranged with respect to the longitudinal axis C-C of the diffuser basket 40. In the illustrated embodiment, the openings 72a-72b are progressively larger (i.e., going from the inlet end 74 of the diffuser basket 60 to the outlet end 76 of the diffuser basket).

As shown the flow modifiers 70a-70b are positioned at a predetermined standoff distance "SD" with respect to each other. The flow modifier 70a located closest to an inlet end 74 of the diffuser basket 60 can be positioned at a predetermined inlet standoff distance "ISD" from the inlet end 74, and/or at a predetermined screen inlet standoff distance "SSD" from the upstream end 61 of the screen portion 42. The standoff distance "SD," inlet standoff distance "ISD" and screen inlet standoff distance "SSD" can be of the same magnitude, or they can be of different magnitudes.

FIGS. 5A-5D show another embodiment of the disclosed diffuser basket 80. The illustrated diffuser basket 80 may include a screen portion 82, a solid cylindrical member 84, a lower screen plate 86 and a solid or perforated plate element 88 that are the same as or similar to those described in relation to the embodiment of FIGS. 2A-2E. The diffuser basket 80 may also include a plurality of flow modifiers 90a-90b positioned within the screen portion 82 at spaced intervals along the longitudinal axis D-D of the diffuser basket. The illustrated embodiment includes two flow modifiers 90a-90b that comprise truncated cone elements having cone surfaces oriented at oblique angles θa-θb with respect to the longitudinal axis D-D of the diffuser basket 80. In some embodiments these oblique angles θa-θb are between 0-degrees and 90-degrees. In the illustrated embodiment, the oblique angles θa-θb are different from each other. That is, the oblique angle θa of one flow modifier 90a is larger than the oblique angle θb of the second flow modifier 90b. In some embodiments, however, the cone angles θa-θb can be the same, while in other embodiments the oblique angle θa may be smaller than the oblique angle θb.

Each of the flow modifiers 90a-90b may further have a respective opening 92a-92b concentrically arranged with respect to the longitudinal axis C-C of the diffuser basket 40. In the illustrated embodiment, the openings 92a-92b are progressively larger (i.e., going from the inlet end 94 of the diffuser basket 80 to the outlet end 96 of the diffuser basket). In addition, the upstream ends 94a, 94b of the flow modifiers 90a, 90b are positioned in the same plane (i.e, the upstream ends are located at the same position along the longitudinal axis C-C).

Further, the flow modifiers 90a, 90b are coupled together via a plurality of vanes 95a-95d spaced around the circumference of the flow modifiers. The plurality of vanes 95a-95d are positioned at 90-degree intervals, though other intervals and other numbers of vanes can be used. The plurality of vanes 95a-95d can be oriented so that their side surfaces are aligned with the longitudinal axis C-C of the diffuser basket 80. Alternatively, one or more of the plurality of vanes can be oriented so that their side surfaces are angled with respect to the longitudinal axis C-C so as to impart an angled or rotating flow to the incoming fluid.

As shown the flow modifiers 90a, 90b are positioned at a predetermined standoff distance "SD" with respect to each other. The flow modifier 90a located closest to an inlet end 94 of the diffuser basket 80 can be positioned at a predetermined inlet standoff distance "ISD" from the inlet end 94, and/or at a predetermined screen inlet standoff distance "SSD" from the upstream end 81 of the screen portion 82. The standoff distance "SD," inlet standoff distance "ISD" and screen inlet standoff distance "SSD" can be of the same magnitude, or they can be of different magnitudes.

Figure 5A:
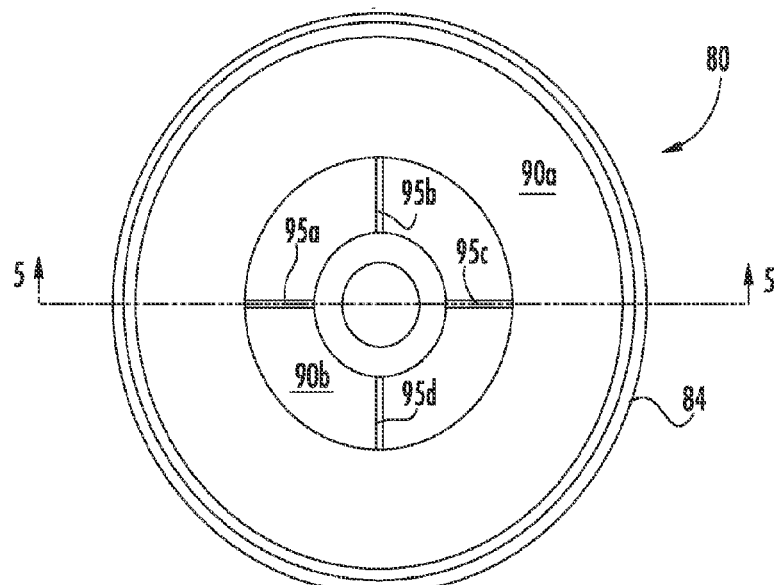
FIG. 5A is a top view of an embodiment of the discloses diffuser basket.
Figure 5B:
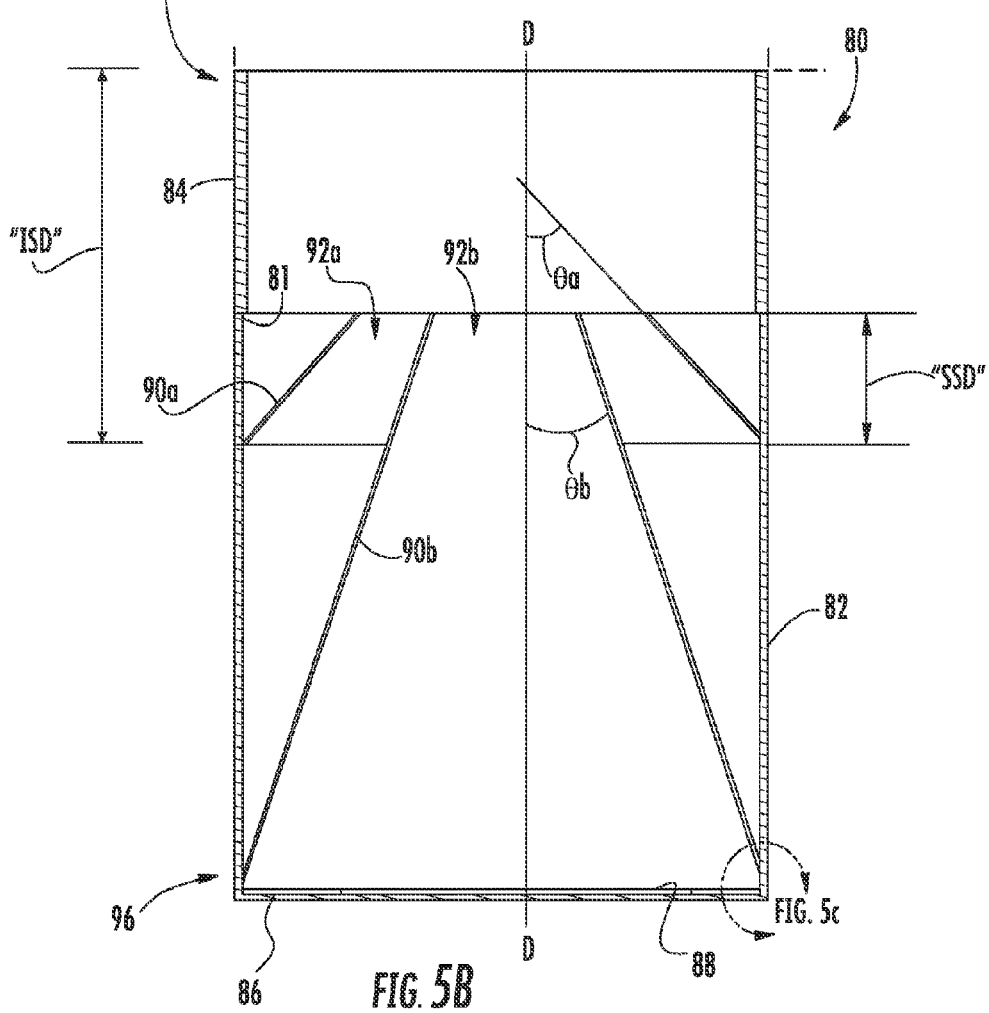
FIG. 5B is a cross-section views of the diffuser basket of FIG. 5A taken along line 5-5 of FIG. 5A.
Figure 5C:
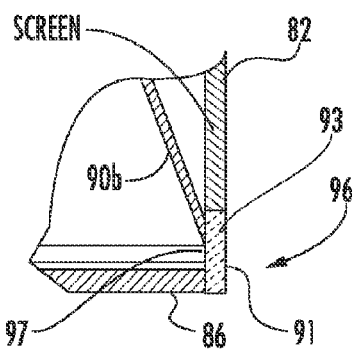
FIG. 5C is a detail view of a portion of the cross-section view of FIG. 5B.
Figure 5D:
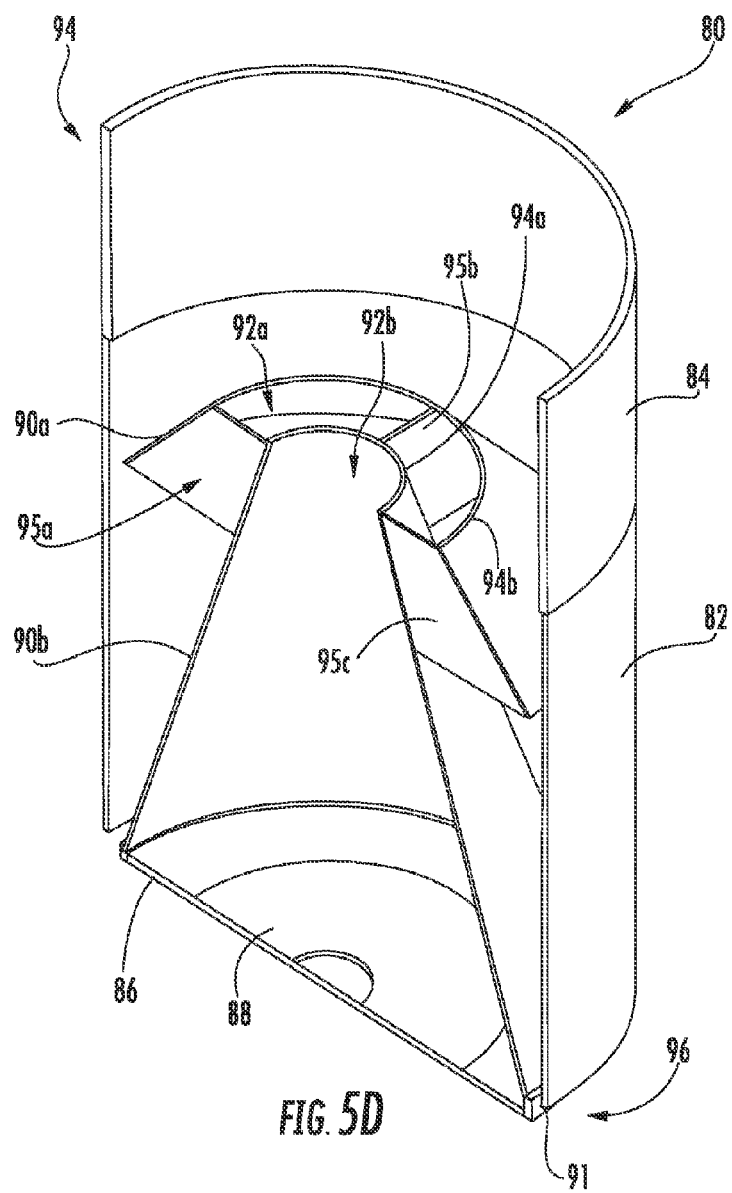
FIG. 5D is a cutaway view of the diffuser basket of FIG. 5a taken along line 5-5 of FIG. 5A.

FIG. 5C shows an embodiment of the coupling between one of the flow modifiers 90b and the screen portion 82 of the diffuser basket 80. In this embodiment, the flow modifier 90b is coupled to a ring element 91. The ring element 91 can be a circumferential solid ring member having an upper end 93 welded or otherwise joined to the screen portion 82, and an inner surface 97 welded or otherwise joined to the flow modifier 90b. The lower screen plate 86 can also be welded or otherwise joined to the ring element 91 along its inner surface 97 just below the flow modifier coupling point.

Figure 6A:
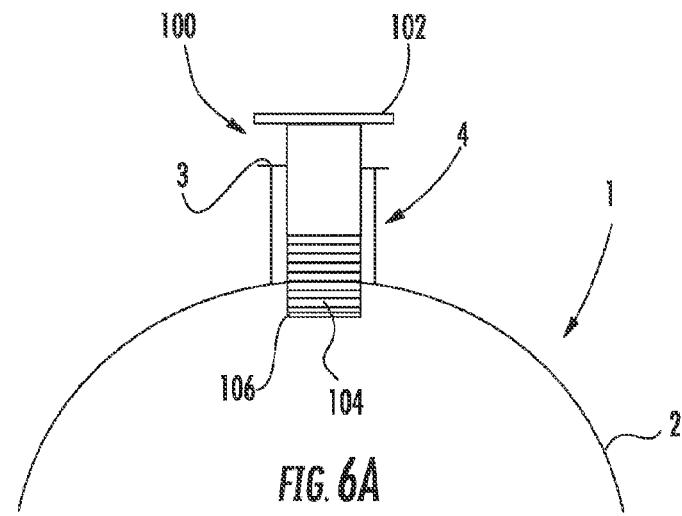
FIGS. 6A-6C are schematic views of embodiments of the disclosed diffuser basket engaged with an exemplary pressure vessel inlet.
Figure 6B:
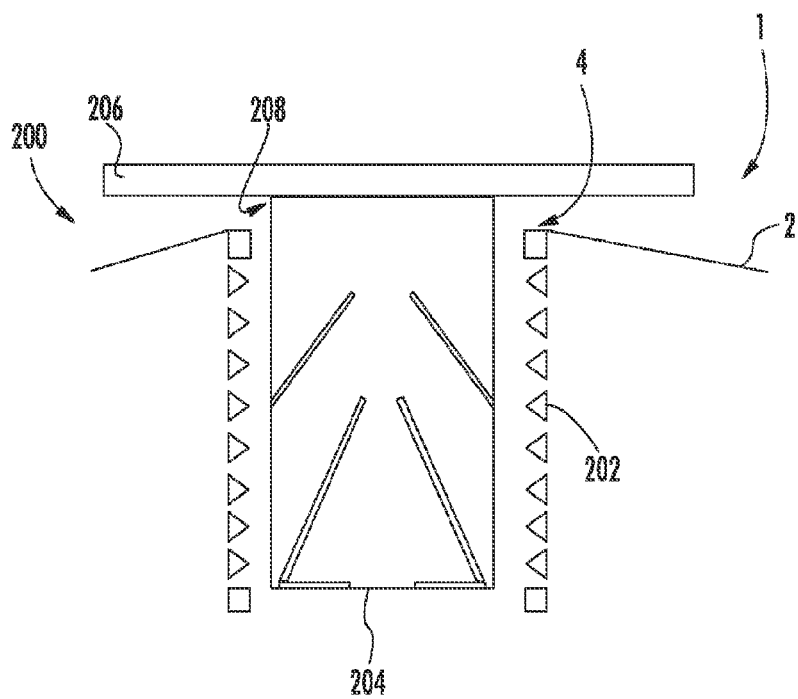
Figure 6C:
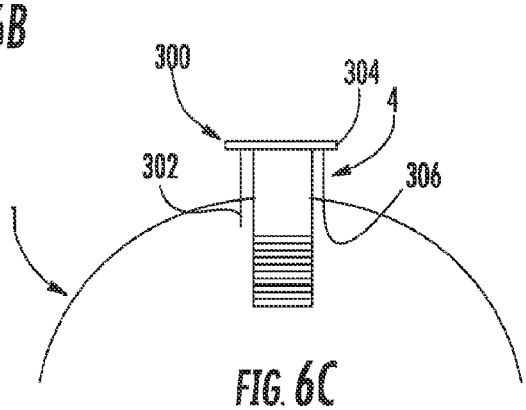

FIGS. 6A-6C show embodiments of the disclosed diffuser basket (10, 40, 60, 80) installed in the vessel inlet 4 of an exemplary pressure vessel 1. In FIG. 6A, the diffuser basket is illustrated as a "drop-in" assembly 100 including an interface portion 102 and a diffuser basket portion 104. In one non-limiting exemplary embodiment the interface portion 102 may be a flange sized and configured to engage a flange 3 on the vessel inlet 4. The diffuser basket portion 104 may be any of the previously described embodiments of the diffuser basket (10, 40, 60, 80) and can be sized to fit within the vessel inlet 4. The diffuser basket portion 104 can have an outlet end 106 that extends into the vessel body 2 so that fluid introduced through the diffuser basket can be distributed to media within the vessel body in a desired manner.

FIG. 6B illustrates an embodiment in which the diffuser basket assembly 200 includes a screen potion 202 that is welded directly to the vessel body 2 of the pressure vessel 1. A flow modifier portion 204 includes any or all of the previously described flow modifier embodiments as well as an interface portion 206 located on an upstream end 208 of the flow modifier portion. In the illustrated embodiment, the interface portion 206 is a flange sized and configured to engage a flange (not shown) on the vessel inlet 4 or an outlet of the supply piping (not shown). In this embodiment, the flow modifier portion 204 may be sized to fit within the screen portion 202 when the two are installed.

FIG. 6C shows an embodiment in which the diffuser basket assembly 300 is a removable assembly that fits into a cowel insert 302 in the vessel inlet 4 of the pressure vessel 1. The cowel insert 302 can be mechanically coupled or welded to the vessel inlet 4 or to the vessel sealing flange. The cowel insert 302 can have a distal end 306 that ends at the interior boundary of the pressure vessel 1, or it can extend into the pressure vessel to provide a lower point of fluid initial entry into the pressure vessel if it is desired for the particular application.

In some embodiments the screen portions (14, 42, 62, 82) can comprise a wedge-wire type screen element, although it will be appreciated that other screen types can also be used as desired. Examples of such other screen types can include, but are not limited to, perforated plate, mesh or other porous filtration materials. The screen portions (14, 42, 62, 82) can be formed of one or more screen elements, including a single screen type or a plurality of different screen types as desired for a particular application.

Further, although the flow modifiers (16a-d, 50a-d, 70a-b, 90a-b) are illustrated as being solid plate members, they can be plates that include perforations. The perforations can be of any size and/or shape appropriate for achieving a desired flow dispersal. The flow modifiers can be coupled to the screen portion using any of a variety of techniques, including welding, brazing, or other mechanical interconnection. Although the openings in the flow modifiers are shown as being concentrically arranged, they can be offset. In addition, although the openings are shown as being circular, one or more of the flow modifiers can have other geometric or non-geometric shapes as desired.

Although inlet and outlet piping connections are not shown, it will be appreciated that such connections, as well as associated system elements (pumps, valves, etc.) will normally be provided to complete the fluid flow path. In addition, although the illustrated pressure vessel 1 is a vertically oriented vessel, it will be appreciated that the disclosed diffuser basket can be used in vessels having other configurations, including horizontal. Further, although the illustrated arrangement shows the diffuser basket as being installed in the vessel inlet 4, it will be appreciated that the diffuser basket can also be provided in the vessel outlet 6, as desired.

As described, the diffuser elements within the disclosed diffuser basket can direct flow from a central inlet region across most or all of the cross section of the vessel, thus enhancing fluid distribution to the filter media within the vessel. The number, angle, spacing and other dimensions of the flow control devices within the diffuser basket can be varied in the design to achieve the desired effect.

Advantageously, the disclosed diffuser basket can optimize distribution without complex pre-distributor trays or heavy structure. The diffuser basket can improve inlet fluid distribution as compared to a traditional plate or plain inlet. The disclosed diffuser basket also may be easy to adapt, easy to maintain, and may provide process flow distribution at a minimum of pressure drop. The diffuser basket can also be added to new pressure vessels with a minimum of changes in the overall design, or it can be easily retrofit to existing pressure vessels without the need for vessel modification.

As will be appreciated, the disclosed diffuser basket distributes flow to multiple locations within the pressure vessel, thereby providing better flow distribution. In addition, the diffuser basket reduces flow velocity of the inlet fluid, thus reducing undesired effects on light media. The diffuser basket can also prevent migration of media within the vessel during backwashing operations.

By using the disclosed diffuser basket, flow entering the vessel can be directed to critical areas in the media, and reduces "short-cuts," "flow channeling" and other undesirable effects of poor distribution. Key benefits may include improved flow control; minimal long term maintenance; minimal changes in vessel access; low implementation costs and effort; security in preventing media migration from the vessel during backwash; low pressure drop in operation, and minimal effect on costs to operate the vessel.

The disclosed diffuser basket can be used in alkylation units; dehydrogenation units; hydrocracking/hydrotreating units; molecular sieve units; claus units; as well as many other petrochemical and refining applications. The diffuser basket may also find application in vessels in which some improvement in performance is desired, but cost or space requirements do not allow for complex distribution systems. The diffuser basket can improve performance simply by installing it into inlet of the vessel (replacing less efficient inlets that may already be in place). Any process where better distribution and reduced impact from initial flow is beneficial to the media could benefit from the use of the diffuser basket. Non-limiting exemplary sizes for the diffuser basket include from 6 to 36 inches. The diffuser basket can fit within an existing pressure vessel inlet using a welded or flange connected, or it can be implemented an insert to an existing pressure vessel inlet. The diffuser basket size can be matched to the size of pipe already used with (or planned to be used with) the pressure vessel.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While the disclosed system has been described with reference to certain embodiments, numerous modifications, alterations and changes to the described embodiments are possible without departing from the sphere and scope of the present invention, as defined in the appended claim(s). Accordingly, it is intended that the disclosed system not be limited to the described embodiments, but that it has the full scope defined by the language of the following claims, and equivalents thereof.

The invention claimed is:

1. A diffuser basket, comprising:
   a screen portion;
   a flow modifier positioned within the screen portion;

a lower screen plate connected to the screen portion at an outlet end of the diffuser basket; and a plate element connected to the lower screen plate, the plate element having at least one plate segment and at least one opening, wherein the flow modifier is configured to change the direction of flow of a fluid introduced into the diffuser basket, and wherein the plate segment controllably blocks flow out of the outlet end of the diffuser basket.

2. The diffuser basket of claim 1, wherein the plate element comprises a plurality of plate segments surrounding a central opening.

3. The diffuser basket of claim 1, wherein the flow modifier comprises a plurality of truncated conical plates positioned at spaced apart intervals along a longitudinal axis of the diffuser basket, the plurality of truncated conical plates coupled to the screen portion.

4. The diffuser basket of claim 3, wherein each of the plurality of flat truncated conical plates includes a central opening.

5. The diffuser basket of claim 3, wherein each of the plurality of flat truncated conical plates has a cone angle that forms an oblique angle with respect to the longitudinal axis.

6. The diffuser basket of claim 5, wherein the cone angle of a first of the plurality of flat truncated conical plates is different from the cone angle of a second of the plurality of flat truncated conical plates.

7. The diffuser basket of claim 3, wherein the plurality of truncated conical plates include at least a first truncated conical plate and a second truncated conical plate, wherein the first and second truncated conical plates are coupled together via a plurality of vanes.

8. The diffuser basket of claim 7, wherein the plurality of vanes are oriented such that side surfaces of the vanes are aligned with the longitudinal axis of the diffuser basket.

9. The diffuser basket of claim 1, wherein the flow modifier comprises a plurality of flat plates positioned at spaced apart intervals along a longitudinal axis of the diffuser basket, the plurality of flat plates coupled to the screen portion.

10. The diffuser basket of claim 9, wherein the plurality of flat plates each comprise an opening.

11. The diffuser basket of claim 10, wherein the openings of the plurality of flat plates are concentrically aligned.

12. A method for diffusing flow of a fluid, comprising:
introducing fluid into an inlet of a diffuser basket, the diffuser basket comprising a screen portion and a flow modifier positioned within the screen portion;

dispersing flow of the fluid onto a media surface opposite the diffuser basket; and controlling flow from an outlet end of the diffuser basket using a plate element positioned adjacent to the screen portion, said plate element including at least one plate segment and at least one opening, wherein the flow is dispersed according to a configuration of the flow modifier.

13. The method of claim 12, wherein the plate element comprises a plurality of plate segments surrounding a central opening.

14. The method of claim 12, wherein the flow modifier comprises a plurality of truncated conical plates positioned at spaced apart intervals along a longitudinal axis of the diffuser basket, the plurality of truncated conical plates coupled to the screen portion.

15. The method of claim 14, wherein each of the plurality of flat truncated conical plates includes a central opening.

16. The method of claim 14, wherein each of the plurality of flat truncated conical plates has a cone angle that forms an oblique angle with respect to the longitudinal axis.

17. The method of claim 16, wherein the cone angle of a first of the plurality of flat truncated conical plates is different from the cone angle of a second of the plurality of flat truncated conical plates.

18. The method of claim 14, wherein the plurality of truncated conical plates include at least a first truncated conical plate and a second truncated conical plate, wherein the first and second truncated conical plates are coupled together via a plurality of vanes.

19. The method of claim 18, wherein the plurality of vanes are oriented such that side surfaces of the vanes are aligned with the longitudinal axis of the diffuser basket.

20. The method of claim 12, wherein the flow modifier comprises a plurality of flat plates positioned at spaced apart intervals along a longitudinal axis of the diffuser basket, the plurality of flat plates coupled to the screen portion.

21. The method of claim 20, wherein the plurality of flat plates each comprise an opening.

22. The method of claim 21, wherein the openings of the plurality of flat plates are concentrically aligned.

* * * * *